United States Patent
Murphy et al.

[19]
[11] Patent Number: 6,125,868
[45] Date of Patent: Oct. 3, 2000

[54] METHOD AND APPARATUS FOR MAINTAINING VALVES IN A WATER DISTRIBUTION SYSTEM

[75] Inventors: Kevin P. Murphy, Oak Brook, Ill.; Michael J. Redman, Fremont, Ind.; Garland Y. Smith, Hinsdale, Ill.

[73] Assignee: Hydra-Stop, Inc., Alsip, Ill.

[21] Appl. No.: 09/176,602

[22] Filed: Oct. 21, 1998

Related U.S. Application Data

[60] Provisional application No. 60/089,764, Jun. 18, 1998.

[51] Int. Cl.⁷ .......................... F16K 37/00; F16K 31/02; G01M 19/00
[52] U.S. Cl. .......................... 137/1; 73/168; 73/862.51; 73/862.541; 137/315.01; 137/551; 137/899; 235/375; 700/83; 700/90; 702/33; 702/41; 251/129.01; 251/292
[58] Field of Search .......................... 137/315, 551, 137/899, 315.01; 251/129.01, 291, 292; 73/168, 862.29, 862.541, 862.51; 235/375; 700/83, 90; 702/33, 41

[56] References Cited

U.S. PATENT DOCUMENTS

| | | |
|---|---|---|
| 173,362 | 2/1876 | Starbuck . |
| 863,180 | 8/1907 | Howard . |
| 1,979,340 | 11/1934 | Norman . |
| 2,393,482 | 1/1946 | Smith . |
| 2,503,563 | 4/1950 | Ray . |
| 2,559,337 | 7/1951 | Balmforth . |
| 2,894,723 | 7/1959 | Gustafson . |
| 4,093,179 | 6/1978 | Schmidt . |
| 4,176,522 | 12/1979 | Holtzapple . |
| 4,274,438 | 6/1981 | LaCoste ................................ 137/551 |
| 4,280,373 | 7/1981 | Denkowski . |
| 4,585,025 | 4/1986 | Hendrick . |
| 4,621,789 | 11/1986 | Fukamachi . |
| 4,679,764 | 7/1987 | Smith . |
| 4,690,168 | 9/1987 | Kihm . |
| 4,715,248 | 12/1987 | Gant . |
| 4,760,547 | 7/1988 | Duxbury . |
| 4,790,514 | 12/1988 | Marks . |
| 4,989,830 | 2/1991 | Ratnik . |
| 5,056,046 | 10/1991 | Mutchler et al. ........................ 137/551 |
| 5,058,464 | 10/1991 | McGovern . |
| 5,063,505 | 11/1991 | Pate . |
| 5,173,855 | 12/1992 | Nielsen . |
| 5,339,239 | 8/1994 | Manabe . |
| 5,340,078 | 8/1994 | Dean . |
| 5,453,130 | 9/1995 | Maddox . |
| 5,492,009 | 2/1996 | Kempf et al. ........................... 137/551 |
| 5,517,428 | 5/1996 | Williams . |
| 5,553,991 | 9/1996 | Ferreira . |
| 5,557,537 | 9/1996 | Normann . |
| 5,616,829 | 4/1997 | Balaschak et al. ...................... 137/551 |
| 5,657,245 | 8/1997 | Hecht . |
| 5,737,227 | 4/1998 | Greenfield . |
| 5,810,051 | 9/1998 | Campagna et al. ..................... 137/899 |

*Primary Examiner*—George L. Walton
*Attorney, Agent, or Firm*—Anthony S. Zummer

[57] ABSTRACT

A method and apparatus for maintaining valves in a water distribution system is the subject matter. A description is prepared of each valve in the system. An individual identifying symbol is assigned to each valve. The identifying symbol and the valve individual description and location, is loaded into a computer database. A group of valves in the system is selected to define an inspection route. A portable computer is loaded with the information regarding each valve along the inspection route. A valve turning machine is positioned adjacent to a selected valve. The valve turning machine includes an identification reader, a timer and the portable computer. A reader identifies a select valve by means of its symbol and the symbol is recorded in the portable computer. The turning machine is connected to the stem of the selected valve to turn the stem in a selected direction. The number of revolutions of the valve stem is counted and recorded in the portable computer. The lapsed time of each revolution of the valve stem is recorded in the portable computer. The condition of the selected valve is recorded in the portable computer. Each succeeding valve on the inspection route is inspected as described above. The information collected in the portable computer is downloaded into the database.

23 Claims, 11 Drawing Sheets

| SURVEY INFO | VALVE INFO | ROUTES | UPDATE MASTERS | ADMINISTRATION |

FIND   BAR CODE
◁ ▷  0999

VALVE ID: 604D03
ATLAS PG: 13

ADDRESS: 500 E COLLEGE ST.
STREET 1: COLLEGE ST.
STREET 2: PARKER AVE.
DIM. OFF LL1: 26' S OF NLL
DIM. OFF LL2: 12' E OF WLL
STRUCTURE: VALVE VAULT
ALT. LOCATION:
MFR. NAME: MUELLER
ADDRESS 1: 500 W ELDORADO ST.
ADDRESS 2: DECATUR, IL. 52522
CONTACT:

SIZE: 8"   #TURNS: 25   DIR. TO OPEN: CW
TYPE: BUTTERFLY
NORMAL POSITION: CLOSED
CURRENT STATUS: OK
LAST INSPECTED: 12/01/97   BY: V

SURVEY NOTES/PROBLEMS:
HIGH TORQUE TO OPEN:
7-9 TURNS FROM CLOSED
VERY HIGH TORQUE TO OPEN:
9-11 AND 19-20 TURNS FROM
CLOSED
CHECK LEAKING PACKING ON
DISK SHAFT

114

EXIT

| SURVEY INFO | VALVE INFO | ROUTES | UPDATE MASTERS | ADMINISTRATION |

TABLE NAME
SURVEY INFORMATION

SELECT A RECORD TO EDIT

| 141 | 12/08/1997 | 1002 |
| 142 | 12/08/1997 | 1004 |
| 116 | 12/01/1997 | 0999 |
| 110 | 11/26/1997 | 1003 |
| 109 | 11/26/1997 | 1003 |
| 108 | 11/26/1997 | 1001 |
| 106 | 11/26/1997 | 1003 |
| 105 | 11/26/1997 | 1003 |

128

SURVEY DATE: 12/01/1997

BY: RJN

STATUS: OK

TOTAL TURNS: 25

NOTES: HIGH TORQUE TO OPEN 7-9 TURNS FROM CLOSED
VERY HIGH TORQUE TO OPEN: 9-11 AND
9-20 TURNS FROM CLOSED
CHECK LEAKING PACKING ON DISK SHAFT

130

VALVE BAR CODE: 0 999
VALVE ID NO: 604D03
POSTING TIME: 1:00:00
POSTING DATE: 12/15/97

ADD  EDIT  DELETE  EXIT

FIG.12

REPAIR/MAINTENANCE LIST
1. SELECT CATEGORY CODE

CODE  CATEGORY

2   BROKEN VALVE STEM   OK

2. LIST VALVES BY: ⦿ BAR CODE  ○ VALVE ID.
3. HIGHLIGHT/SAVE VALVES TO BE PRINTED.

| VALVE | SIZE | ROUTE |
|---|---|---|
| 0097 | 6 | E.SIDE- RTE.1 |
| 1005 | 6 | E.SIDE- RTE.1 |
| 1011 | 8 | E.SIDE- RTE.1 |
| 1613 | 6 | E.SIDE- RTE.2 |
| 1618 | 8 | E.SIDE- RTE.2 |
| 2039 | 12 | N.SIDE- RTE.3 |
| 2311 | 10 | S.SIDE- RTE.2 |
| 2326 | 4 | W.SIDE- RTE.1 |
| 2329 | 4 | W.SIDE- RTE.1 |

TOTAL ON LIST  23

SAVE ON LIST    PRINT LIST    CANCEL    EXIT

Tabs: SURVEY INFO | VALVE INFO | ROUTES | UPDATE MASTERS | ADMINISTRATION

PRINT SURVEYS FINISHED

OK    CANCEL

DATA PATH:
C:\HYDRASTP\

📁 C:\
  📁 HYDRAOP

DRIVERS
▭ C

# METHOD AND APPARATUS FOR MAINTAINING VALVES IN A WATER DISTRIBUTION SYSTEM

CROSS REFERENCE TO RELATED APPLICATION

The present application is a continuation-in-part of provisional application Serial No. 60/089,764, filed Jun. 18, 1998, titled, "Method and Apparatus For Maintaining Valves Of A Network For Transporting Fluids."

BACKGROUND OF THE INVENTION

A water distribution system typically includes water mains for delivering water through the system with valves located in the water mains to control the flow of water through the mains. A water distribution system may be laid out in a municipality or other geographic area with the valves strategically placed to control selectively the flow of water to various parts of the system.

The water mains and the associated valves of a water distribution system typically are located underground. Each of the underground valves is subject to corrosion, build-up of dirt and other debris with the passage of time. These build-ups and corrosion deposits can restrict water flow through the valve and greatly increase the torque required to open or close that valve. The aging of a valve may cause the packing around a valve stem to leak. Furthermore, a valve may be damaged by workmen who turn the valve for a variety of reasons such as a requirement to redirect water service or by an unauthorized person who attempts to turn the valve.

An inspection of all of the valves in a water distribution system is necessary for proper maintenance of the system. The inspection not only includes observing the condition of each valve, but also turning the valve stem of each valve to a fully closed position and a fully open position of the valve. Notation of the facility with which a given valve stem turns, number of stem revolutions to open and close the valve and the time required to make each turn forms a basis for proper evaluation of the condition of each valve. All system valves are assigned into inspection routes. Many routes may be required to make an inspection of all of the valves. A well-organized inspection route provides optimum utilization of time and manpower in inspecting selected valves of the system. Once the valves are inspected, information regarding each of the valves must be evaluated with a view to selecting valves which are in the greatest need of repair and to schedule repair of those valves before repairing valves having a lesser need.

A commonly used procedure for identifying the condition of valves in a system is to dispatch an inspection team to each of several routes so that at least one inspection team visits each valve location. The team inspects each valve and makes a written notation of the condition of the valve. Depending upon valve size, one or more members of the team turns the valve stem a number of turns to close the valve fully and to open the valve fully. The position of the valve after inspection, that is, whether it is left opened or closed, is recorded. In some instances, the inspection team is unable to turn a valve stem, especially the stem of a large valve that has been not turned for some time and corrosion of parts of the valve prevents free turning of a valve stem. In those cases where the inspection team is unable to turn the valve within the time allotted for inspecting the valve, the team notes the inability to turn the valve and moves onto the next valve location leaving the seized valve to be repaired by a maintenance crew. The exact count of the number of turns to open or close any valve is often lost in the course of making the turns. Thus, the recorded number of turns made by the valve stem to open or close the valve is not always accurate.

The recorded information gathered during inspection of each valve is deposited in a central location where it is available for analysis. Persons who are charged with the responsibility of supervising the maintenance of the system often find it difficult to grade accurately the condition of all of the valves in the system in order to prioritize maintenance of the valves. Difficulties arise because the information for each valve is either incomplete or not correct. The prioritization of repairs must be balanced both by condition of the valves and the relative distance between the valves in the system to effect efficient maintenance of the system valves.

It is desirable to provide a method and apparatus for identifying and recording the condition of each of the valves in the water distribution system. This method and apparatus would effect an efficient maintenance program for the valves by providing an apparatus to record accurately information relating to each valve inspected. Additionally, it would use computers for storing and sorting information regarding the condition and location of each valve in the system to make repairs in an efficient orderly manner.

SUMMARY OF THE INVENTION

The present improved method and apparatus for maintaining valves in a water distribution system includes identifying the location of each valve and preparing an individual description of each valve of the system. An identifying symbol is assigned to each valve. All of the information regarding each individual valve including its location and description is loaded into a central computer database. An identifying symbol for each individual valve is positioned in association with each valve at the valve's location in the system. An inspection route is created by selecting a group of valves in the system. The information regarding each of the valves on the inspection route is loaded into a hand-held portable computer. A valve turning machine with the hand-held portable computer, an identification reader, a revolution counter and a timer is transported to the location of a selected valve which is part of the inspection route. The identification of the operator, who is to control turning of the valve stem of the valve, is recorded into the hand-held portable computer. The identification reader recognizes the identifying symbol of the valve and the symbol is recorded in the hand-held portable computer. At this time, the screen on the hand-held portable computer displays the pertinent information about the valve, such as, size, number of turns to fully stroke, and whether it is supposed to be open or closed.

The turning machine is connected to the valve stem of the selected valve. The turning machine includes an electric motor which is connected to the stem through a speed reducer, a clutch and a shaft. The motor is activated and the stem is turned in a selected direction, that is, either clockwise or counterclockwise. The number of revolutions of the valve stem in the selected direction is counted and recorded in the hand-held portable computer. A continuous clock time is also recorded for the start and completion of each revolution. After the valve reaches the desired position of open or closed, the valve stem is turned in the opposite direction to the opposite position. The number of turns in the opposite direction and clock time are recorded in the hand-held portable computer. The valve gate is then positioned in its required position in the system. The condition of the valve is recorded in the hand-held portable computer. Each succeeding valve on the inspection route is inspected using the above-identified inspection procedure. If a valve is seized and cannot be turned, a record is made of the actual time spent attempting to turn the stem of that valve. Upon completion of the inspection route, the information collected at each valve by the hand-held portable computer is downloaded into the central computer database. The central computer calculates elapsed time for each turn of each valve stem and sorts the downloaded data to provide orderly access for persons who supervise the water system maintenance. The information in the database relating to all of the valves of the system is reviewed to select valves for repair.

DESCRIPTION OF THE PRESENT INVENTION

Figure 1:
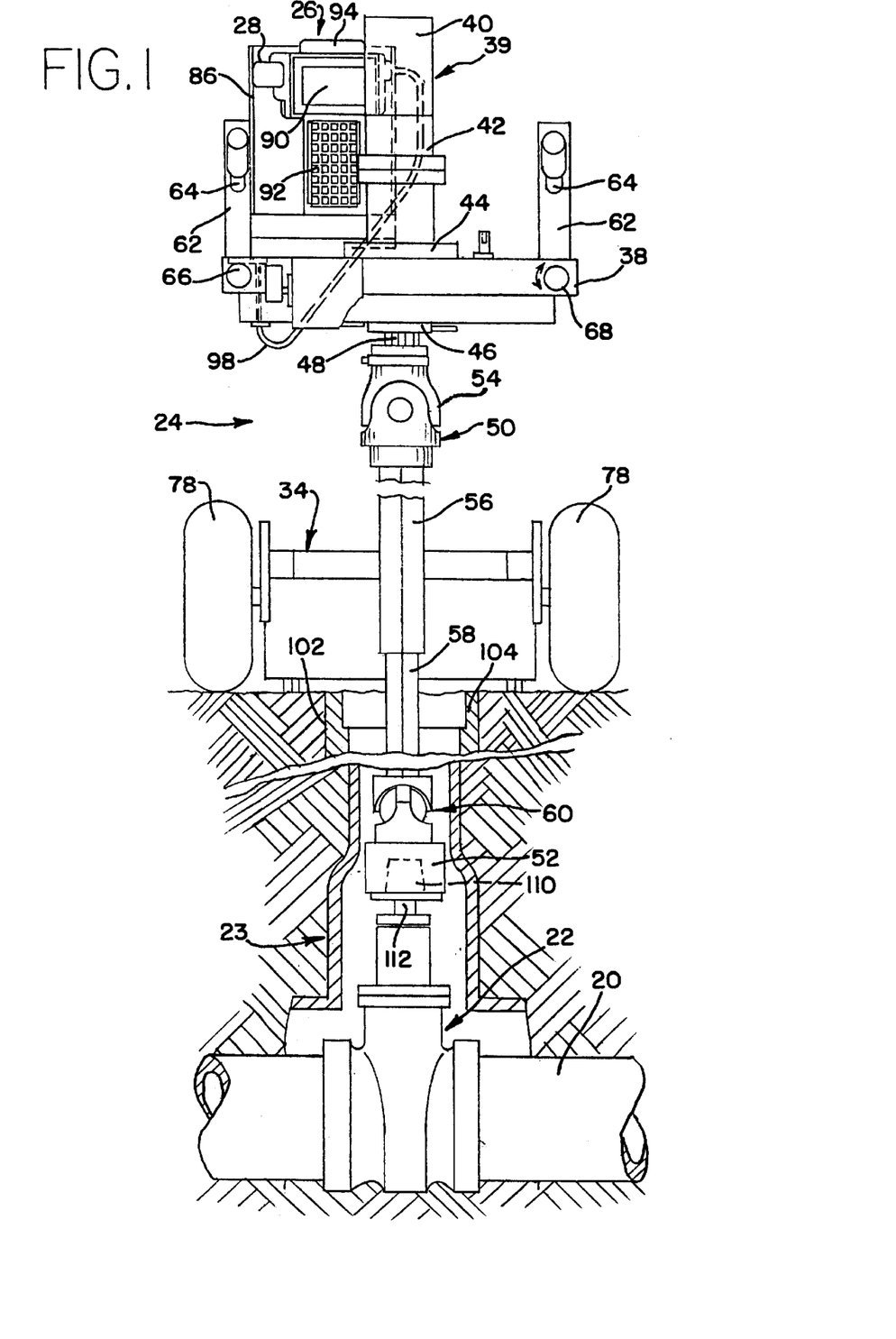
FIG. 1 is an end elevational view of a valve turning machine being a part of the instant invention, positioned adjacent to a valve box and connected to a valve, which valve is in turn connected to a water main of a water distribution system.
Figure 2:
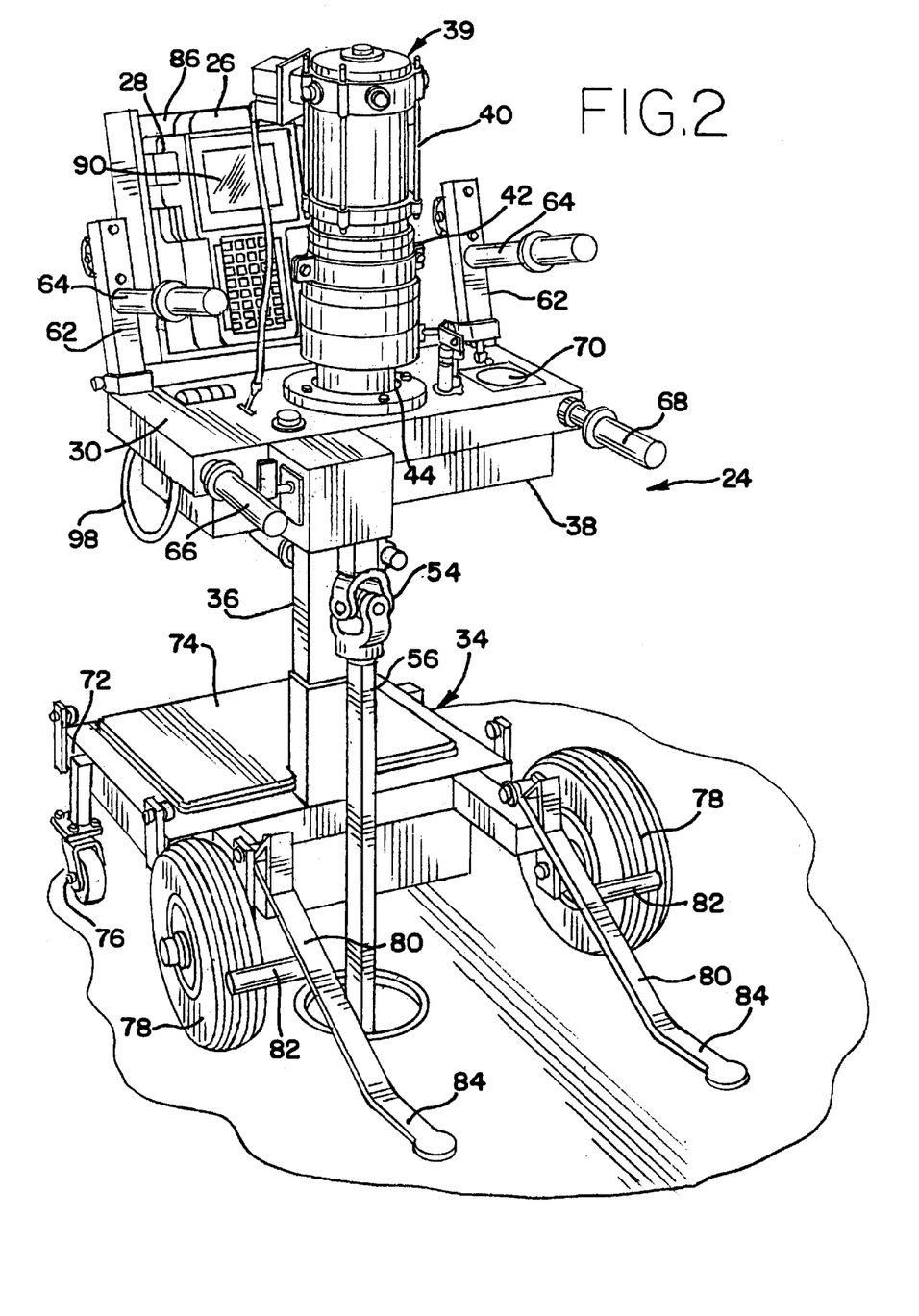
FIG. 2 is a perspective view of the valve turning machine of FIG. 1 positioned adjacent to the valve box of the water distribution system.

Referring now to the drawings, and especially to FIGS. 1 and 2, a conventional water distribution system includes a water main 20 laid underground. A conventional and well known valve 22 is connected to the water main for controlling the flow of water through the main. A conventional valve box 23 is mounted above the valve to provide a vertical, unobstructed access chamber for tools to operate the valve. As an alternate to valve box 23, a vault or manhole may be constructed to surround the valve and extend to the ground surface. The following procedures are the same for valves in either boxes or vaults. A valve turning machine generally indicated by numeral 24 is positioned adjacent to the valve box and is shown connected to valve 22. A conventional hand-held portable computer 26 with a conventional scanner or identification reader 28 connected thereto is connected to the turning machine. A conventional solid state revolution counter 30 on the turning machine is electrically connected to the hand-held portable computer 26 which contains a continuous computer clock.

The turning machine includes a frame 34 with an upright column 36 mounted thereon. The column supports a console 38. A drive assembly 39 is mounted on console 38 and is releasably connected to valve 22. Drive assembly 39 includes a conventional DC motor 40 mounted on top of a geared speed reducer 42 which is in turn connected to a flanged bearing housing 44 and a conventional hydraulic clutch 46. A spline 48 is mounted in clutch 46 and is connected to a drive shaft assembly 50. The drive shaft assembly has a valve operator nut socket 52 on its lower end releasably connectable to valve 22. Drive shaft assembly 50 includes an upper universal joint assembly 54 which joins the spline to an outer telescopic tube 56. The outer telescopic tube 56 mateably receives an inner telescopic tube 58, which has a lower universal joint assembly 60 connected thereto. The lower universal joint assembly is connected to operator nut socket 52.

Console 38 has a pair of handle support posts 62 mounted on opposite sides of the console, as may be seen in FIG. 2. A grip bar 64 is mounted on each post to provide a holding means for manipulating the valve turning machine. Console 38 has a handle bar 66 on one side and a hydraulic piston pump regulating grip 68 on the other side. A screw-actuated hydraulic piston is hydraulically connected to the hydraulic clutch through a piping system, as is conventional, and not shown herein. By rotating grip 68, the piston may be moved relative to the hydraulic system to adjust the pressure applied to the clutch and thereby regulate the amount of torque transmitted through the clutch. An oil pressure gauge 70 is mounted on the console and is connected to the hydraulic system. The hydraulic pressure gauge acts as a torque indicator, in that, the higher the hydraulic pressure in the clutch, then the greater the torque output of the clutch.

Figure 3:
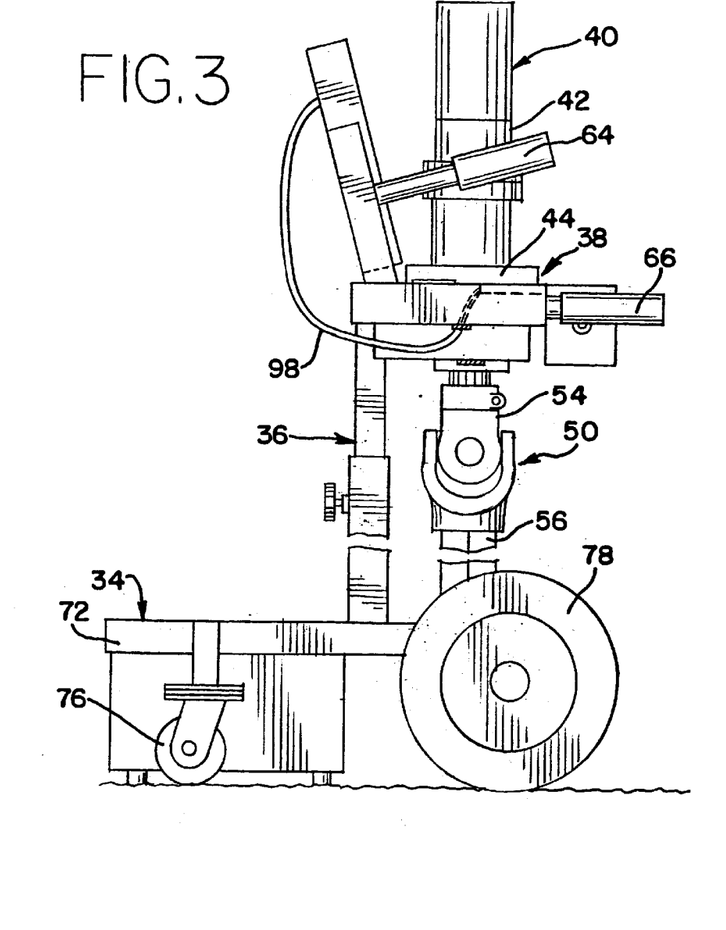
FIG. 3 is a side elevational view of the valve turning machine of FIGS. 1 and 2 with portions omitted for clarity.
Figure 4:
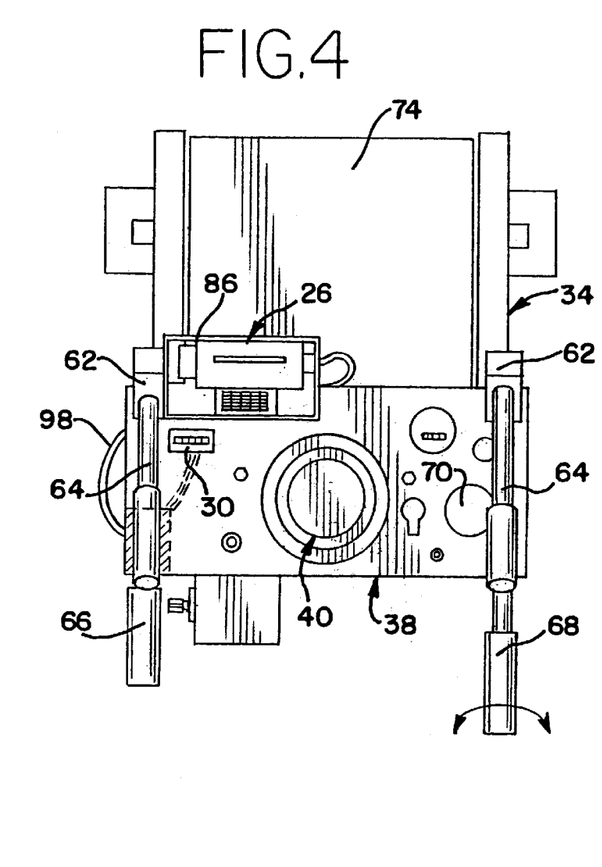
FIG. 4 is a top view of the valve turning machine of FIGS. 1 and 2 with portions omitted for clarity.
Figure 5:
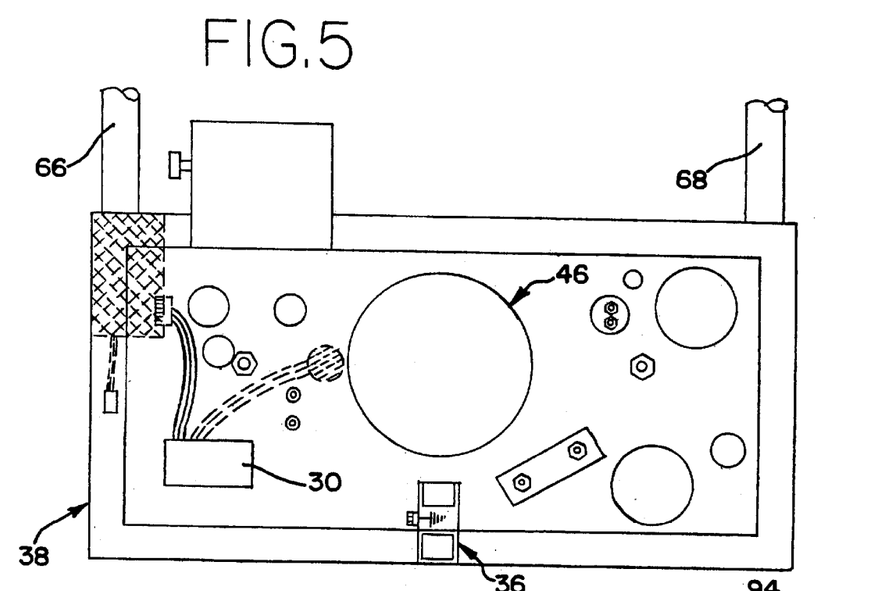
FIG. 5 is a bottom view of a console portion of the valve turning machine of FIGS. 1 and 2.

Frame 34 includes a battery box 72 with a pair of conventional batteries 74 mounted therein to provide a source of electric power to DC motor 40. The frame has a pair of swivel casters 76 mounted adjacent to one edge and a pair of conventional wheels 78 mounted adjacent to the opposite edge. A pair of lever stops 80 is pivotally attached to the frame. Each of the lever stops includes a friction bar 82 engageable with a respective wheel 78. Each of the lever stops includes a cantilevered footrest 84, whereby an operator may stand on the two footrests 84 to force bars 82 into engagement with the outer periphery of the respective wheels 78 and thereby lock the wheels into position.

Figures 6, 7:
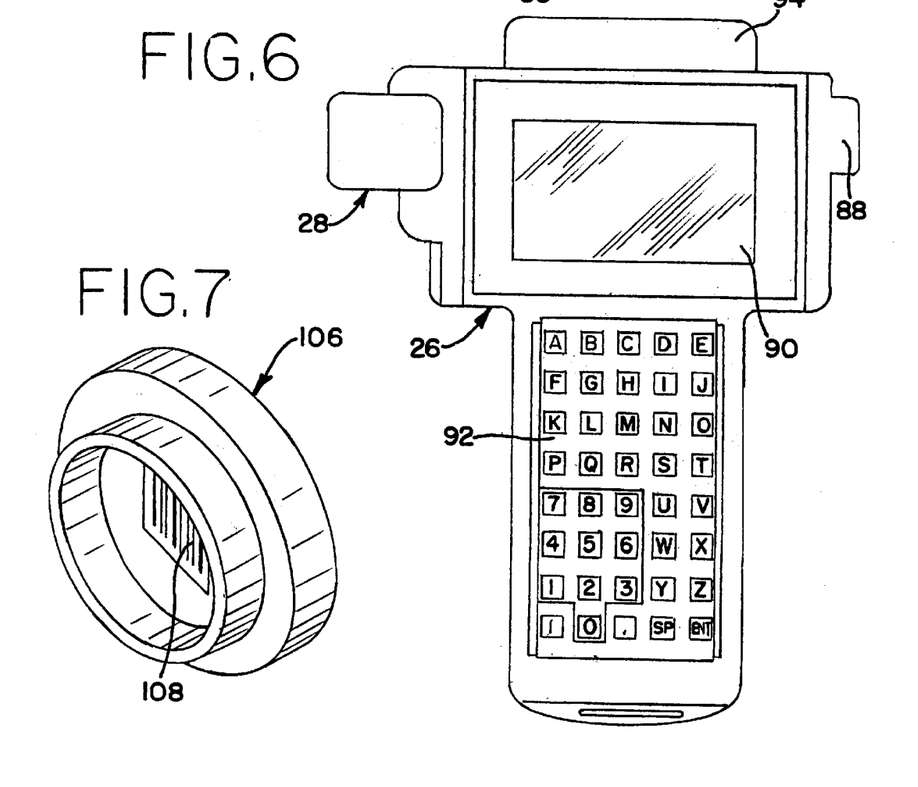
FIG. 6 is a plan view of a hand-held portable computer with scanner head connected to the valve turning machine of FIGS. 1 and 2.
FIG. 7 is a perspective view of a valve box cover for the valve box of FIGS. 1 and 2.

Hand-held portable computer 26 is supported in a mounting bracket 86. Computer 26 includes a cable receptacle 88 and a screen 90, which is best shown in FIG. 6. A conventional input keyboard 92 is a part of the hand-held portable computer. Computer 26 includes a receptacle 94 for receipt of a small electronic data storage and transfer device which is commonly known as a PC card. Scanner 28 is mounted on and electrically connected to the portable computer. The hand-held portable computer is electrically connected to counter 30 by an exterior cable 98, so that the number of rotations of the shaft is entered into the portable computer. The computer clock assigns and records a time-of-day at each pulse from counter 30. If the valve is seized and the stem will not turn, the motor on and motor off times are recorded.

A typical valve location is shown in FIG. 1. Valve 22 is a gate valve, though a butterfly or other type of valve may be used instead. Valve box 23 has an upper portion 102 with a valve box recess 104. A valve box cover 106 is shown in FIG. 7 and fits into the valve box recess 104, as is conventional.

Each valve in the system is located on a large map of the complete system. The complete map is divided into sheets of an atlas, such as that shown in FIG. 14. The sheets of the atlas and information about each of the valves of the system is loaded into the central computer database and is stored on the hard drive of that computer (which is not shown herein).

Figure 9:
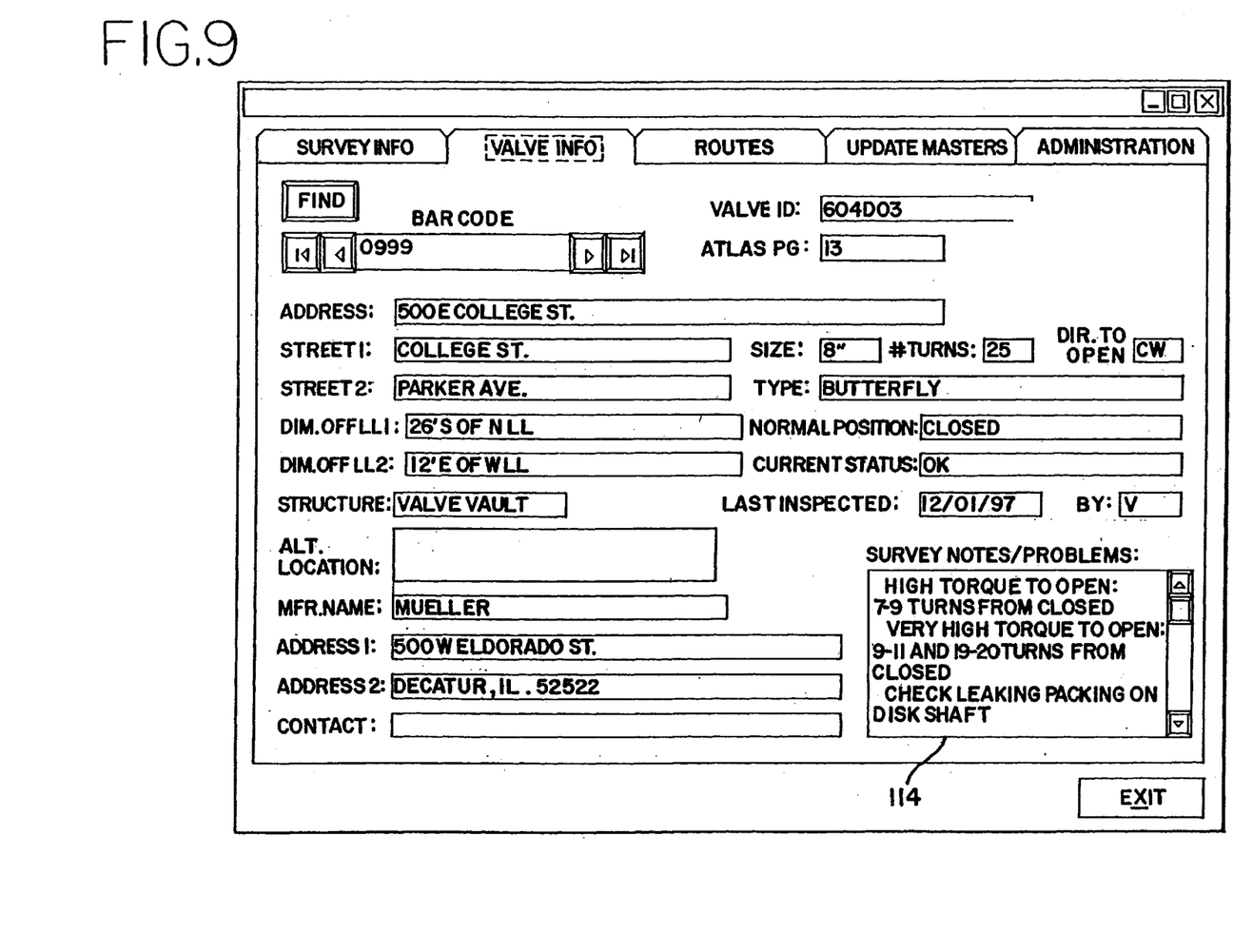
FIG. 9 is a view of a screen of the computer database showing a dialog box with the file tab: valve info., and used to display summary information relating to a selected valve.

Each valve has a valve identification symbol and each valve has a bar code number. The bar code for each valve is positioned in association with the valve. In the case of valve 22, a bar code 108 is positioned inside valve box cover 106, as may be seen in FIG. 7. The specific description of each valve including the size, the number of turns to open the valve and the direction to open the valve, along with the type and the manufacturer's name and address, is recorded in the computer database. The normal position of the valve in the system is indicated, along with the current status of the valve. The location of the valve is identified by the street address and its position relative to property lot lines or to alternative physical landmarks, or to a satellite global position system. The survey notes for each valve also include any operational problems in turning the valve, including leakage or other defects and problems of accessibility. A typical database screen with the file tab "valve info" is shown in FIG. 9. In addition to permanent data regarding the specific valve, a portion of the screen titled "survey notes/problems" 114 provides additional information.

Figure 8:
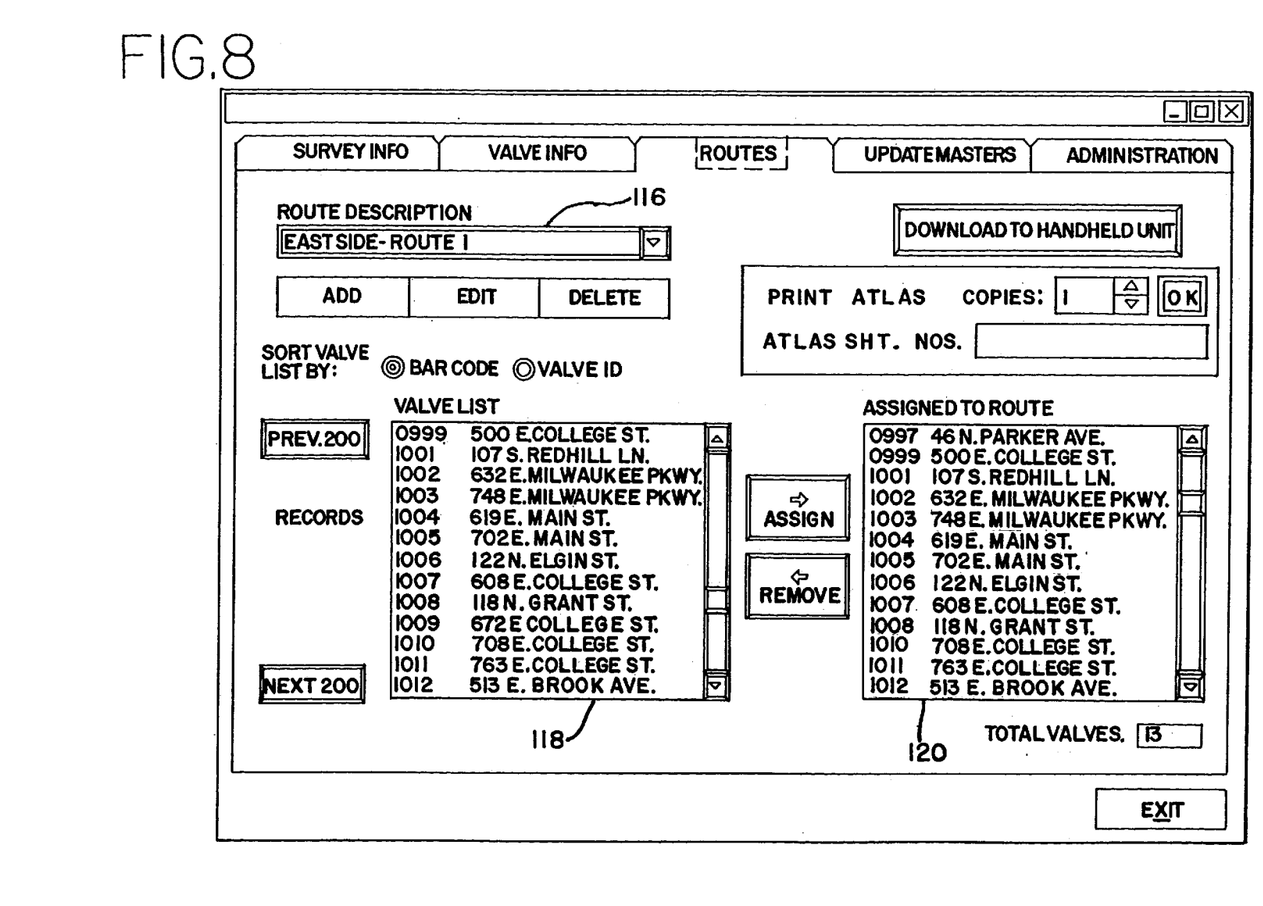
FIG. 8 is a view of a screen of a computer database showing a dialog box with the file tab: routes, and used to select valves to be assigned to designated inspection routes.
Figure 13:
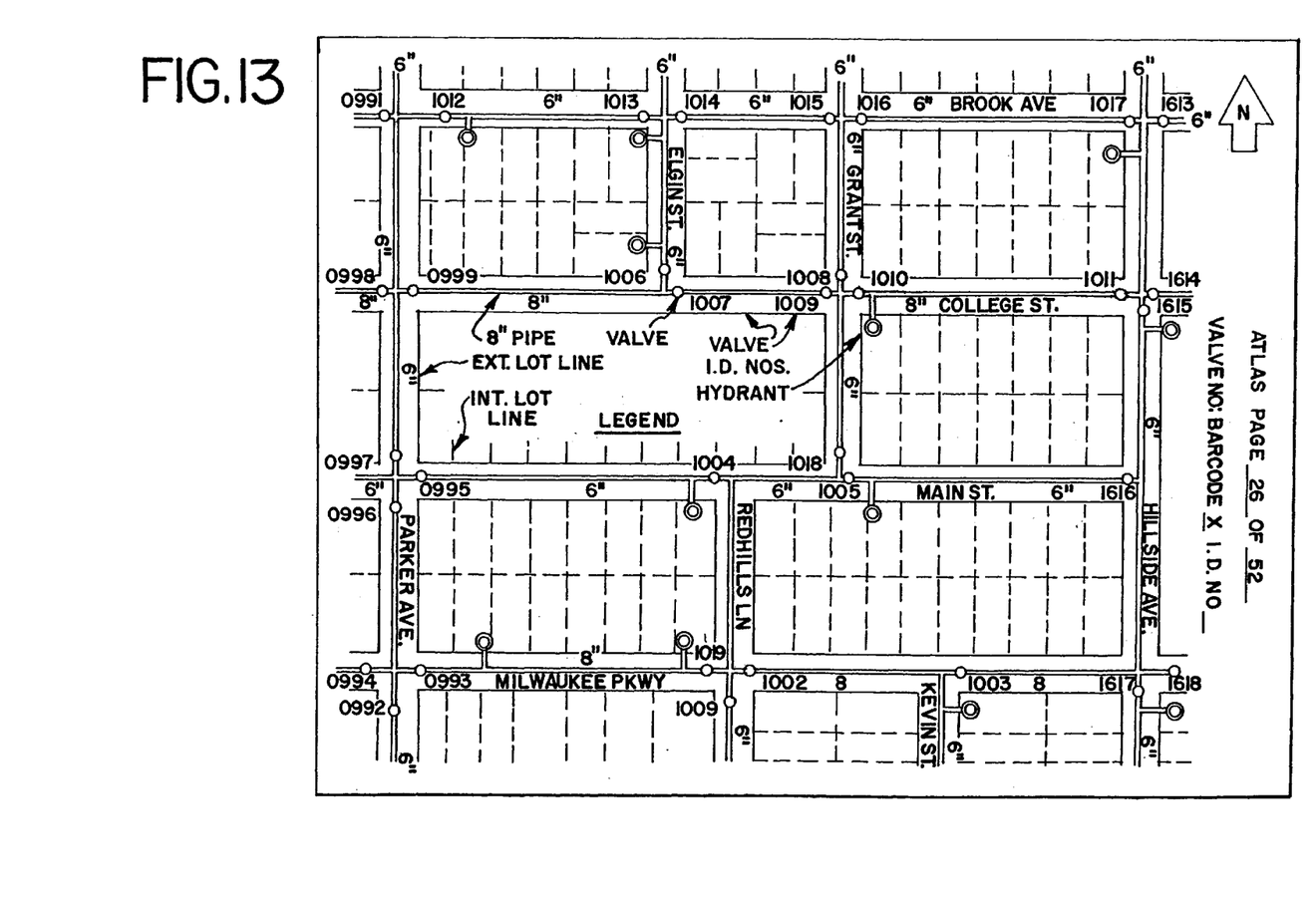
FIG. 13 is a view of a screen showing a page of an atlas, which is part of a map of the entire water distribution system.
Figure 14:
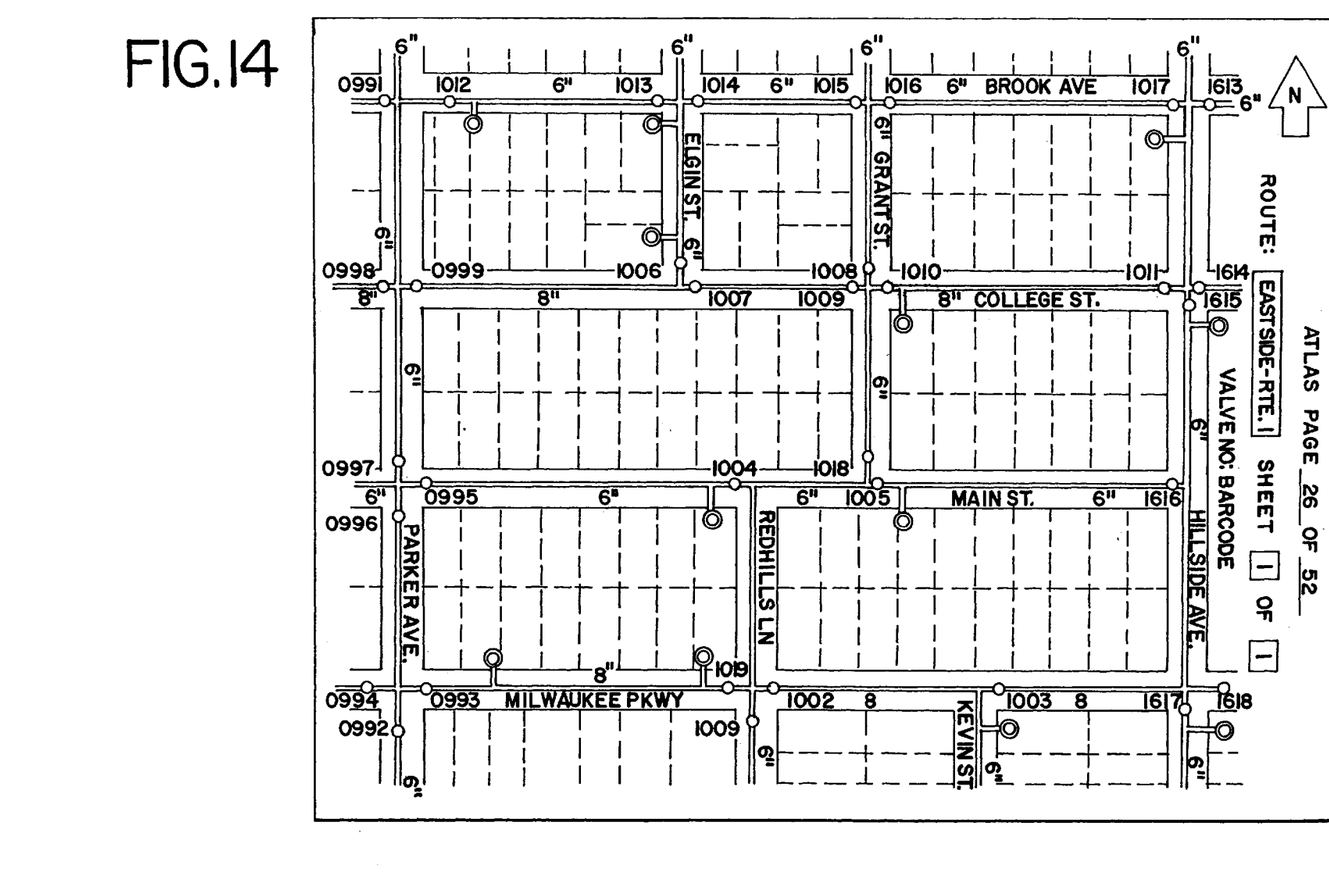
FIG. 14 is a view of a screen of the computer database showing an atlas page selected for and identified to a specific valve inspection route.

Persons responsible for maintaining a water distribution system utilize the system map and atlas sheets, such as FIG. 13, to select an inspection route. Referring to FIG. 8, which is a computer database screen, with the file tab "routes", the route description 116 is first entered. The valves to be inspected on that route are selected from a "valve list" 118 which comprises all of the valves in the system. The selected valves and street addresses are then displayed as "assigned to route" 120. The computer then compiles specific data for all valves assigned to the route. These data are shown on FIG. 9. The compiled information is then downloaded from the central computer onto a PC card, which then is transferred to the portable computer 26. If the route is complicated, atlas sheets, specific to the route, as shown in FIG. 14, are issued to the inspection team. The inspection route and all information regarding the assigned valves have thus made available to an inspection team. The inspection team transports the valve turning machine and associated equipment to the location of the first valve to be inspected. The operator of the valve turning machine enters into the portable computer the identification of the route and the identification of the operator. The portable computer is removed from the support frame and the scanner is utilized as an identification reader to scan the bar code 108 on the interior of the valve box cover 106 in association with the valve 22. The description of the valve and associated information from previous inspections is brought up on the screen 90 of the portable computer, which informs the team of the direction to turn the valve stem to open or close the valve and the number of turns required.

The valve operator nut socket 52 is positioned in valve box 23 and into engagement with a standard square valve operating nut 110, which is fixed to a valve stem 112 of valve 22. The valve stem, as is conventional, is connected to a gate in the valve to control the valve.

Motor 40, which is electrically connected to the batteries 74, is energized to rotate the shaft assembly. The telescopic arrangement of tubes 56 and 58 allows the turning machine to operate with valves at varying depths. The arrangement of the upper and lower universal joint assemblies allows a misalignment of spline 48 with valve stem 112. The rotation of the motor through the gear reducer causes the spline to operate at a lower speed. However, to protect the valve stem, the clutch has minimal engagement. If minimal engagement of the clutch does not turn the valve stem, then by rotation of grip handle 68, the hydraulic oil pressure is increased, and thus, the torque transmitted through the clutch is increased to apply a greater turning force to the valve stem until the valve stem turns. Each revolution of the shaft assembly and thus the valve stem is counted on the counter and recorded in the portable computer, which is the recorder for the inspection. The direction of rotation is also recorded along with the clock time, expressed as time-of-day, of the start and completion of each turn. If the motor cannot turn the valve stem, times are recorded when the motor is energized and de-energized. The valve stem is rotated in one direction until the valve is either completely open or completely closed. Then, the motor is reversed and the valve stem is rotated in the opposite direction. The time for each turn in the opposite direction is recorded as well as the number of turns. Upon completion of the inspection, the valve is positioned in the desired position, that is, open or closed. The operator then notes the condition of the valve and enters the information into the portable computer, which provides a record of the inspection. The portable computer is programmed to allow the operator to use a code input for five common conditions: 1—OK; 2—stem broken; 3—packing leaks; 4—nut missing and 5—valve box needs cleaning. Other conditions common to a given system may be coded in addition to or substituted for those mentioned. A condition of a valve for which there is no code is keyed into the portable computer.

Upon completion of the inspection of the valve and entry of the record of inspection, the inspection team moves the turning machine and associated accessories to the next valve location on the inspection route. The inspection process set forth above is repeated at the next valve location and the record is entered into the portable computer.

In the event that there is an unmapped valve which should be on the system and the inspection team discovers the unmapped valve, the inspection team enters the known particulars into the portable computer. The location is entered, along with the observable description of the valve, such as type, size and manufacturer. A temporary identification number is assigned to the valve and recorded in the portable computer. The valve is then inspected in the same manner as the other valves. The results of the inspection are recorded in the portable computer.

Once all of the valves on the route are inspected, the PC card is removed from the portable computer and positioned in the base computer, which is the database for the valves of the water distribution system. The information from the portable computer is then downloaded in the base computer.

In the event that information of an unmapped valve is downloaded into the database, that information is displayed as a newly found valve and the system map and atlas can be upgraded.

The central computer database contains complete information from all recent inspections of every valve in the system. This is displayed on a screen dialog box such as FIG. 10, which has a file tab "survey info." A list 122 of recent inspections allows review of inspection data from several surveys to determine if valve operating characteristics are changing with time.

Figure 10:
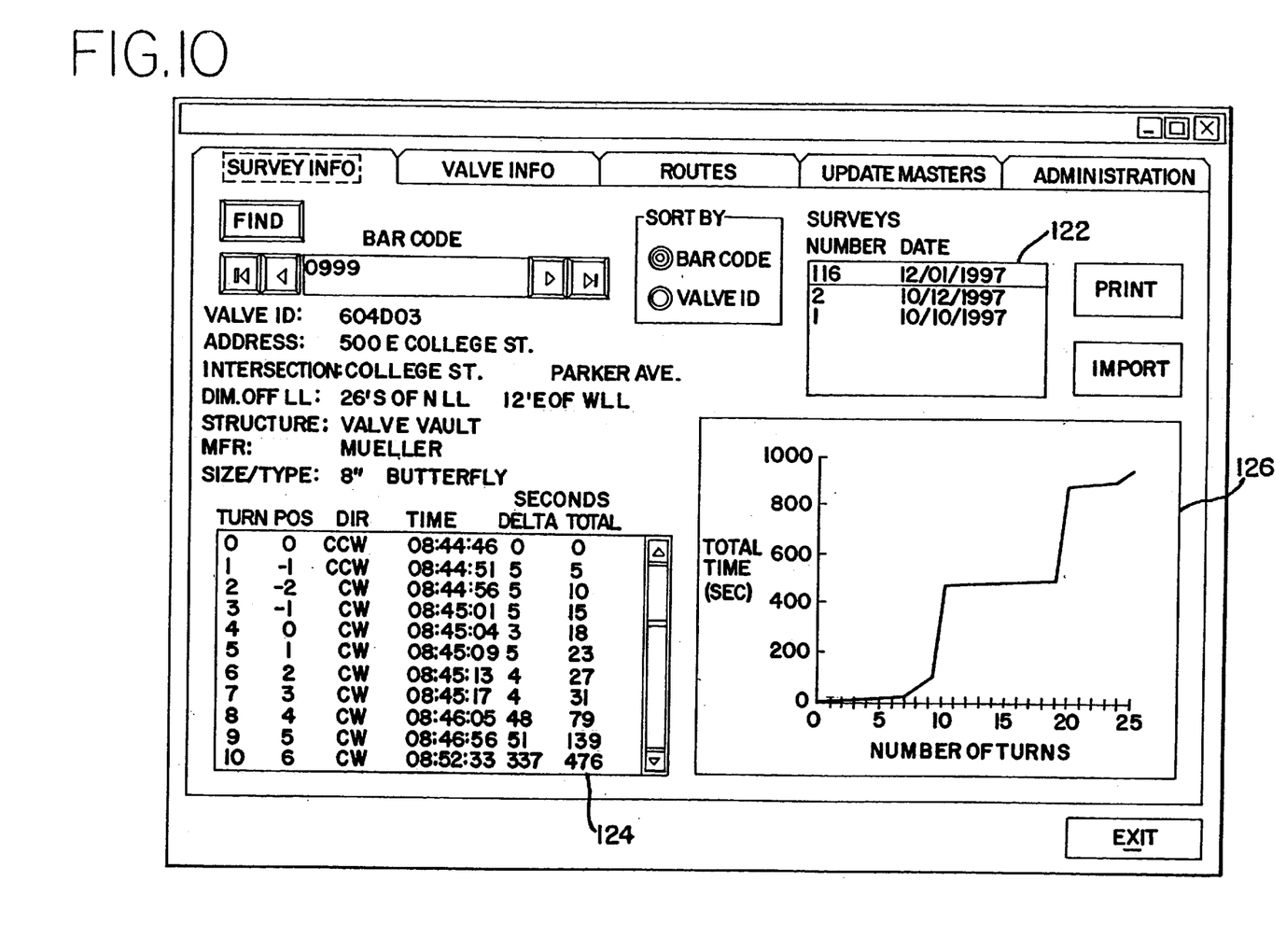
FIG. 10 is a view of a screen of the computer database showing a dialog box with the file tab: survey info., and displaying data from a single inspection of a specific valve.

A table 124 lists and consecutively numbers each revolution (turn) of the valve stem and the elapsed time (delta) for that revolution, which was calculated by the base computer. The individual times are accumulated and listed in the "total" column. A graph 126 generated by the base computer shows the total time required for any number of turns in one direction. A steeply vertical curve indicates difficulty in rotating the valve stem. A summation of the elapsed turning times as shown in the "Total" column of Table 124 for all valves inspected during a work shift provides a factual review of the industriousness of the inspection team during that shift.

Figure 11:
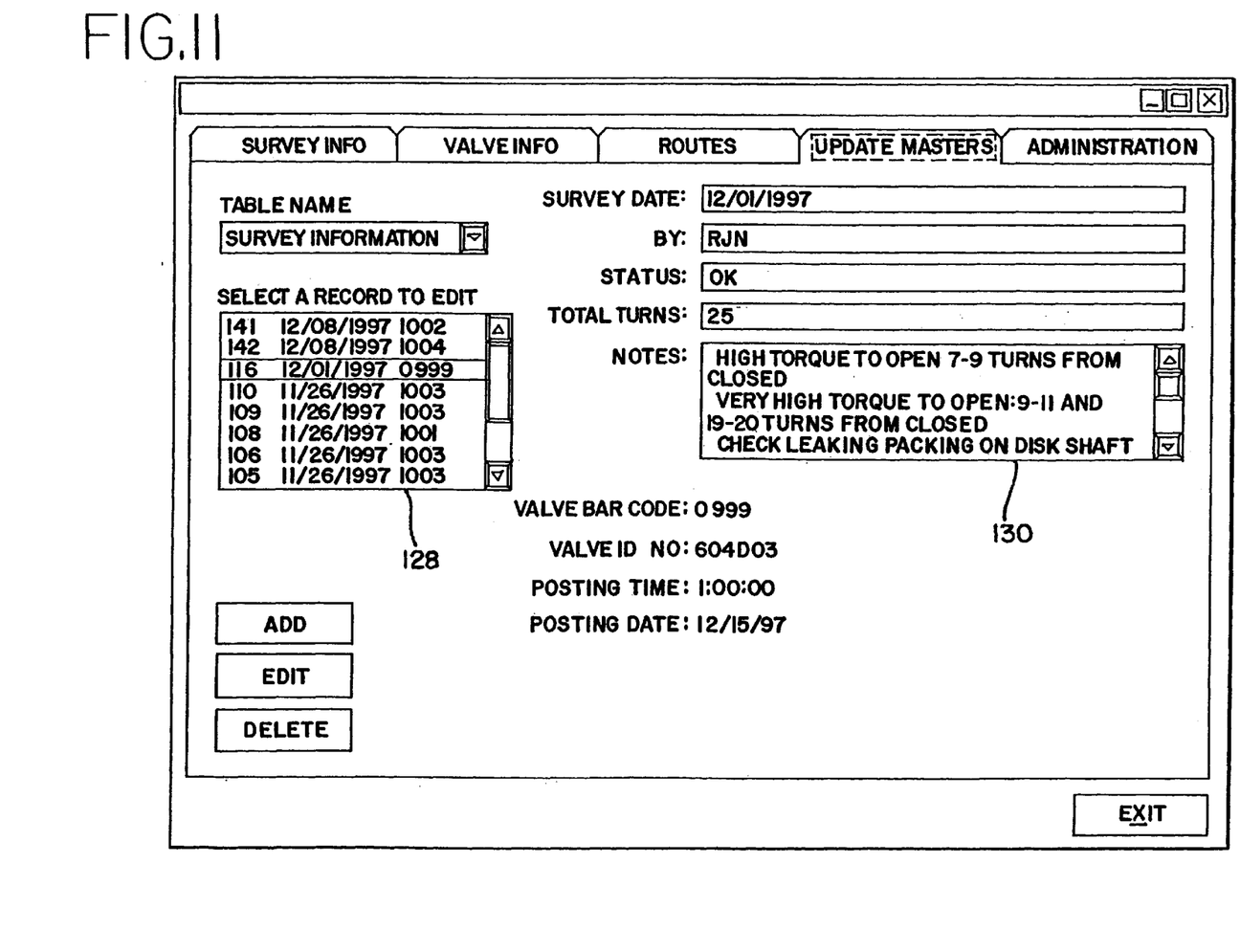
FIG. 11 is a view of a screen of the computer database showing a dialog box with the file tab: update masters, and used to revise summary information in the central computer database that relates to a selected valve.

The data from the most recent inspection of each valve are entered into that valve's permanent database record by using the tab file "update masters" as shown in FIG. 11. The specific valve is selected from a table 128. The recent survey data is displayed along with special notes 130 that were keyed into the portable computer during that inspection.

Figure 12:
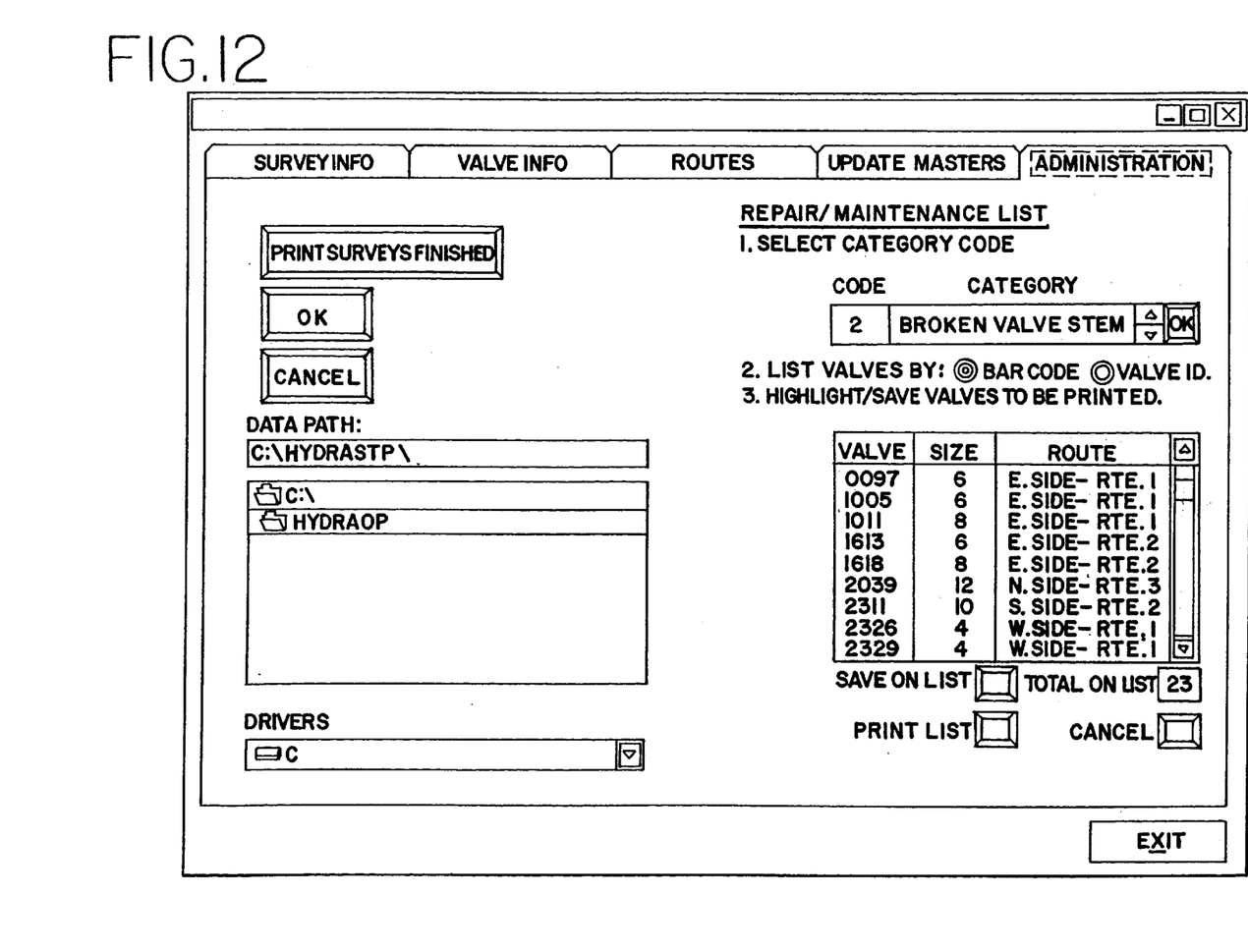
FIG. 12 is a view of a screen of the computer database showing a dialog box with the file tab: administration, and used to select valves that have a common defect that requires repair.

Upon completion of the inspection of all of the valves in the system, persons charged with the responsibility of maintaining the system may call for a summary display of all valves having a particular defect. FIG. 12 with a tab file of "administration" shows a list of valves with a "Code 2" defect, "broken valve stem." The valves are listed by either bar code or valve identification number. The valve size and route identification data allow grouping and prioritization before dispatching crews to repair selected valves. A list of selected valves is printed, followed by printing of the valve information data sheet, FIG. 9, for each selected valve.

The foregoing description and drawings constitute a specific embodiment of the herein disclosed invention. It is to be expressly understood that those skilled in the art may make modifications to the apparatus and the method without departing from the spirit and scope of the present invention. It is to be expressly understood that the instant invention is limited only by the appended claims.

What is claimed is:

1. A method for maintaining valves in a water distribution system, comprising the steps of:
   (a) preparing an individual description of each known valve in the system and the location of each valve;
   (b) assigning an individual identifying symbol to each valve;
   (c) loading into a computer database information for each valve, including the identifying symbol and the valve's individual description and location;
   (d) positioning each valve's individual identifying symbol in association with the valve at its location;
   (e) selecting a group of valves in the system to define an inspection route;
   (f) loading into a portable computer a record of information defining the inspection route and the identifying symbol, individual description and location for each valve on the route;
   (g) transporting to a location of a selected valve on the inspection route a valve turning machine, including an identification reader, a timer, and the portable computer;
   (h) identifying an operator of the turning machine on the record in the portable computer;
   (i) identifying with the identification reader the selected valve by means of the identifying symbol;
   (j) recording the identifying symbol in the portable computer;
   (k) connecting the turning machine to the stem of the selected valve;
   (l) turning in a selected direction the stem of the selected valve;
   (m) counting the number of revolutions of the valve stem in the selected direction and recording the number in the portable computer;
   (n) recording in the portable computer the elapsed time for each revolution of the valve stem in the selected direction;
   (o) placing the selected valve in the desired position for the valve in the system;
   (p) recording the condition of the selected valve in the portable computer;
   (q) inspecting each succeeding valve on the inspection route and repeating steps (h) through (p) of the inspection procedure at each valve;
   (r) downloading into the database the information collected at each valve inspected on the inspection route; and
   (s) reviewing the database to select valves for repair.

2. A method for maintaining valves in a water distribution system, as defined in claim 1, including; turning the valve stem of the selected valve in the direction opposite to the selected direction after turning the valve stem in the selected direction.

3. A method for maintaining valves in a water distribution system, as defined in claim 1, including; turning the valve stem of the selected valve in the direction opposite to the selected direction after turning the valve stem in the selected direction, and recording in the portable computer the elapsed time for each revolution of the valve stem in the direction opposite to the selected direction.

4. A method for maintaining valves in a water distribution system, as defined in claim 1, including; removing from the portable computer a PC card and connecting the PC card to the database for downloading into the database the information collected at each valve.

5. A method for maintaining valves in a water distribution system, as defined in claim 1, including; sorting the identification of the valves in the database by a selected condition of the valves.

6. A method for maintaining valves in a water distribution system, as defined in claim 1, including; displaying on the portable computer the individual description of the selected valve.

7. A method for maintaining valves in a water distribution system, as defined in claim 1, including; selecting a sequence of valve locations to repair the valve at each of the locations.

8. A method for maintaining valves in a water distribution system, as defined in claim 1, including; adding to the record in the portable computer an identification of a valve in the water distribution system not included in the computer database.

9. A method for maintaining valves in a water distribution system, as defined in claim 1, including; applying to the stem of the selected valve a regulated force to rotate the stem without damaging the stem.

10. A method for maintaining valves in a water distribution system, as defined in claim 1, including; turning the valve stem of the selected valve in the direction opposite to the selected direction after turning the valve stem in the selected direction, and removing from the portable computer a PC card and connecting the PC card to the database for downloading into the database the information collected at each valve.

11. A method for maintaining valves in a water distribution system, as defined in claim 1, including; turning the valve stem of the selected valve in the direction opposite to the selected direction after turning the valve stem in the selected direction, and recording in the portable computer the elapsed time for each revolution of the valve stem in the direction opposite to the selected direction, and sorting the identification of the valves in the database by the condition of each of the valves.

12. A method for maintaining valves in a water distribution system, as defined in claim 1, including; recording the condition of each valve in the portable computer.

13. A method for maintaining valves in a water distribution system, as defined in claim 1, including; adding to the record in the portable computer an identification of a valve in the water distribution system not included in the computer database, and selecting a sequence of valve locations to repair the valve at the selected location.

14. A method for maintaining valves in a water distribution system, as defined in claim 1, including; turning the valve stem of the selected valve in the direction opposite to the selected direction after turning the valve stem in the selected direction, recording in the portable computer the elapsed time for each revolution of the valve stem in the direction opposite to the selected direction, and adding to the record in the portable computer an identification of a valve in the water distribution system not included in the computer database.

15. A method for maintaining valves in a water distribution system, as defined in claim 1, including; adding to the record in the portable computer an identification of a valve in the water distribution system not included in the computer database, turning the valve stem of the selected valve in the direction opposite to the selected direction after turning the valve stem in the selected direction, recording in the portable computer the elapsed time for each revolution of the valve stem in the direction opposite to the selected direction, and sorting the identification of the valves in the database by a selected condition for each of the valves.

16. A method for maintaining valves in a water distribution system, as defined in claim 1, including; turning the valve stem of the selected valve in the direction opposite to the selected direction after turning the valve stem in the selected direction, recording in the portable computer the elapsed time for each revolution of the valve stem in the direction opposite to the selected direction, removing from the portable computer a PC card and connecting it to the database for downloading into the database the information collected at each valve, sorting the identification of valves in the database by a selected condition, and selecting a sequence of valve locations to repair the valve at each location.

17. An apparatus for use in maintaining valves in a water distribution system comprising; a turning machine selectively connectable to each of selected valves of the distribution system for selectively turning the stem of each of the valves, a timer connected to the turning machine for timing each turn of each valve stem, a recorder connected to the turning machine to record the turns made by each valve stem and recording the lapsed time for each turn of the valve stem.

18. An apparatus for use in maintaining valves in a water distribution system as defined in claim 17, including; a scanner connected to the recorder for observing an identifying symbol of each valve and recording the symbol in the recorder.

19. An apparatus for use in maintaining valves in a water distribution system as defined in claim 17, wherein said turning machine includes a variable clutch for selecting the amount of force applied to each valve stem to turn the valve stem.

20. An apparatus for use in maintaining valves in a water distribution system as defined in claim 17, wherein the recorder is a portable computer having a PC card for transferring data from the portable computer to another computer.

21. An apparatus for use in maintaining valves in a water distribution system as defined in claim 17, wherein the recorder is a portable computer, a scanner connected to the portable computer for observing an identifying symbol of each valve and recording the symbol in the portable computer, and said portable computer having a PC card for transferring data from the portable computer to another computer.

22. An apparatus for use in maintaining valves in a water distribution system as defined in claim 17, wherein said turning machine includes a variable clutch for selecting the amount of force applied to each valve stem to turn the valve stem, and a scanner connected to the recorder for observing an identifying symbol of each valve and recording the symbol in the recorder.

23. An apparatus for use in maintaining valves in a water distribution system as defined in claim 17, wherein said turning machine includes a variable clutch for selecting the amount of force applied to each valve stem to turn the valve stem, said recorder being a portable computer, a scanner connected to the portable computer for observing an identifying symbol of each valve and recording the symbol in the portable computer, and said portable computer having a PC card for transferring data from the portable computer to another computer.

* * * * *